United States Patent [19]

Falke et al.

[11] Patent Number: 6,087,410
[45] Date of Patent: Jul. 11, 2000

[54] PRODUCTION OF POLYURETHANE FOAMS

[75] Inventors: Peter Falke, Schwarzheide; Inge Rotermund, Ortrand; Marita Schuster, Senftenberg; Steffen Klippert, Schwarzheide, all of Germany

[73] Assignee: BASF Aktiengesellschaft, Ludwigshafen, Germany

[21] Appl. No.: 09/154,382

[22] Filed: Sep. 16, 1998

[30] Foreign Application Priority Data

Sep. 19, 1997 [DE] Germany .............................. 197 41 257

[51] Int. Cl.⁷ ..................................................... C08G 18/48
[52] U.S. Cl. ............................ 521/174; 521/170; 521/172
[58] Field of Search ..................................... 521/174, 170, 521/172

[56] References Cited

U.S. PATENT DOCUMENTS

| | | |
|---|---|---|
| 4,950,694 | 8/1990 | Hager . |
| 4,970,243 | 11/1990 | Jacobs et al. . |
| 5,011,908 | 4/1991 | Hager . |
| 5,162,385 | 11/1992 | Hartwig et al. .......................... 521/118 |
| 5,171,759 | 12/1992 | Hager . |
| 5,187,206 | 2/1993 | Volkert et al. ............................ 521/129 |
| 5,618,854 | 4/1997 | Skorpenske et al. . |
| 5,668,378 | 9/1997 | Treboux et al. . |
| 5,677,361 | 10/1997 | Treboux et al. . |

FOREIGN PATENT DOCUMENTS

| | | |
|---|---|---|
| 0346670 | 12/1989 | European Pat. Off. . |
| 0350868 | 1/1990 | European Pat. Off. . |
| 0406702 | 1/1991 | European Pat. Off. . |
| 0449609 | 10/1991 | European Pat. Off. . |
| 0496420 | 7/1992 | European Pat. Off. . |
| 0704468 | 4/1996 | European Pat. Off. . |
| 0731120 | 9/1996 | European Pat. Off. . |
| WO95/15990 | 6/1995 | WIPO . |

OTHER PUBLICATIONS

English Chem Abstract of EP731120. (1996).

*Primary Examiner*—John M. Cooney, Jr.
*Attorney, Agent, or Firm*—Fernando A. Borrego

[57] ABSTRACT

Polyurethane foams are produced by reacting a) organic and/or modified organic diisocyanates and/or polyisocyanates with b) at least one relatively high molecular weight compound containing at least two reactive hydrogen atoms, c) at least one compound containing from three to eight, preferably from three to six, reactive hydrogen atoms and d) low molecular weight chain extenders and/or crosslinkers containing at least two reactive hydrogen atoms in the presence of e) blowing agents f) catalysts and, if desired, g) further auxiliaries and additives, wherein (c) are ethylene oxide-rich adducts having an ethylene oxide content of more than 50% by weight and an OH number of from 200 to 800 mg KOH/g and (d) are polyfunctional chain extenders and/or crosslinkers having an OH number of more than 700 mg KOH/g.

The polyurethane foam produced by this process can be used as upholstery material.

9 Claims, No Drawings

PRODUCTION OF POLYURETHANE FOAMS

The present invention relates to a process for producing polyurethane foams by reacting
- a) organic and/or modified organic diisocyanates and/or polyisocyanates with
- b) at least one relatively high molecular weight compound containing at least two reactive hydrogen atoms plus a combination of
- c) at least one compound containing from three to eight, preferably from three to six, reactive hydrogen atoms and
- d) low molecular weight chain extenders and/or crosslinkers containing at least two reactive hydrogen atoms in the presence of
- e) blowing agents
- f) catalysts and, if desired,
- g) further auxiliaries and additives.

This process produces, in particular, flexible polyurethane foams having improved hardness and increased resistance to humid heat aging.

The production of polyurethanes by reacting organic diisocyanates and/or polyisocyanates with compounds containing at least two reactive hydrogen atoms, for example polyoxyalkylenepolyamines and/or preferably organic polyhydroxyl compounds, in particular polyetherols having molecular weights of, for example, from 300 to 6000, and, if desired, chain extenders and/or crosslinkers having molecular weights up to about 400 in the presence of catalysts, blowing agents, flame retardants, auxiliaries and/or additives is known and has been described many times. A summary overview of the production of polyurethane foams is given, for example, in Kunststoff-Handbuch, volume VII, "Polyurethane", 1st edition 1966, edited by Dr. R. Vieweg and Dr. A. Höchtlen, and 2nd edition, 1983, and also 3rd edition, 1993, edited by Dr. G. Oertel (Carl Hanser Verlag, Munich).

There have been numerous publications on the subject of flexible foams having sufficient hardness which are additionally resistant toward humid heat aging.

Thus, EP-A-449609 describes a highly elastic flexible foam in which an improvement in properties, particularly in respect of the compressive set, is said to be achieved by increased proportions of 2,4-TDI. This makes it possible to reduce the proportions of polymer polyol.

In EP-A-346670, flexible block foams having a very low density at a low index are produced. Here, a six-functional short-chain crosslinker polyol is mixed in to achieve the necessary foam stabilization.

EP-A-496420 describes flame-resistant flexible foams. Here, a combination of nitrogen-containing, short-chain crosslinker polyols and a trifunctional polyol containing at least two secondary OH groups is claimed.

WO 95/15990 describes the use of high-functionality, in particular six-functional, polyols for highly elastic flexible foams. Diethanolamine as chain extender/crosslinker in proportions of up to 5 parts by weight is mentioned as an example.

In EP-A-704468, high-functionality polymer polyols are used for flexible foams. The formulations employed are directed, in particular, at the use according to the invention of relatively high proportions of diols as chain extenders.

EP-A-350868 claims a high-functionality, relatively high molecular weight polymer polyol. As assistant polyol, use is made of a polyetherol having a molecular weight of from 450 to 3000 and an ethylene oxide content of >30%. Ethanolamine species and sugar are mentioned as crosslinkers.

EP-A-406702 mentions ethylene oxide adducts of glycerol as crosslinker polyols, with crosslinkers having a functionality of 2–8 being claimed. Combinations with diethanolamine are claimed here. As a result of the cell-opener polyols used, a very closed-celled foam is said to be obtained in the index range 105–120.

EP-A-731120 mentions foams having improved humid heat aging which are obtained using a polyol mixture comprising at least one polyol having a functionality of 3.5–8 and an ethylene oxide content of 10–30% and at least one polyetherol having a functionality of 2–8 and an ethylene oxide content of 50–95%. Alkanolamine derivatives are mentioned as crosslinkers. Concomitant use of fillers is possible to increase the hardness.

It is an object of the present invention to provide polyurethane foams having improved hardness and increased humid heat resistance, without the other properties of the foam being impaired.

We have found that this object is achieved by using, in addition to the customary component (b) comprising at least one relatively high molecular weight compound containing at least two reactive hydrogen atoms, a specific combination of at least one compound containing from 3 to 8, preferably 3 to 6, reactive hydrogen atoms (c) and low molecular weight chain extenders and/or crosslinkers containing at least two reactive hydrogen atoms (d), wherein the component (c) comprises ethylene oxide-rich adducts having an ethylene oxide content of more than 50% by weight and an OH number of from 200 to 800 mg KOH/g and (d) are polyfunctional chain extenders and/or crosslinkers having an OH number of more than 700 mg KOH/g.

The present invention accordingly provides a process for producing polyurethane foams by reacting
- a) organic and/or modified organic diisocyanates and/or polyisocyanates with
- b) at least one relatively high molecular weight compound containing at least two reactive hydrogen atoms,
- c) at least one compound containing from three to eight, preferably from three to six, reactive hydrogen atoms and
- d) low molecular weight chain extenders and/or crosslinkers containing at least two reactive hydrogen atoms in the presence of
- e) blowing agents
- f) catalysts and, if desired,
- g) further auxiliaries and additives, wherein (c) are ethylene oxide-rich adducts having an ethylene oxide content of more than 50% by weight and an OH number of from 200 to 800 mg KOH/g and (d) are polyfunctional chain extenders and/or crosslinkers having an OH number of more than 700 mg KOH/g.

The invention also provides the polyurethane foam produced by this process and provides for its use as upholstery material.

According to the present invention, the process for producing the polyurethane foams is carried out using, apart from customary components, a specific combination of at least one compound containing from three to eight, preferably from three to six, reactive hydrogen atoms (c) and low molecular weight chain extenders and/or crosslinkers containing at least two reactive hydrogen atoms (d).

As component (c), use is made of ethylene oxide-rich adducts, preferably ethylene oxide adducts of glycerol, trimethylolpropane, pentaerythritol or any mixtures thereof. Suitable initiators for the ethylene oxide adducts are, besides or as a mixture with the abovementioned compounds, further relatively high-functionality initiators, for example sorbitol, ditrimethylolpropane, triethanolamine, diethanolamine and mixtures thereof. It is likewise possible to use further initiators having a functionality of from 3 to 8.

The ethylene oxide is reacted in a customary manner with the initiator or initiator mixture.

The OHN of such ethylene oxide adducts is in the range from 200 to 800 mg KOH/g, preferably from 400 to 700 and in particular from 500 to 700 mg KOH/g.

The ethylene oxide content of the component c) is at least 50% by weight, preferably more than 90% by weight.

The relatively high-functionality compounds (c) are preferably used in proportions of from 0.5 to 10% by weight, in particular in proportions of from 1 to 8% by weight, based on the weight of the components (b) to (g).

As component (d), use is made of polyfunctional chain extenders and/or crosslinkers having an OH number of more than 700 mg KOH/g, preferably glycerol. It is also possible to use trimethylolpropane, pentaerythritol or mixtures of said compounds. Apart from these compounds used according to the present invention, small amounts of the customary chain extenders and/or crosslinkers mentioned below can also be added.

The component (d) is preferably used in proportions of from 0.5 to 6% by weight, particularly preferably in proportions of from 0.5 to 4% by weight, based on the weight of the components (b) to (g).

The molar ratio of (c) to (d) is preferably in the range from 10 to 0.3, in particular from 3.0 to 0.3.

In a particularly preferred embodiment, the component (c) used is a trifunctional polyol based on ethylene oxide and having an OH number of 530 mg KOH/g (Lupranol® VP 9209) in an amount of from 5 to 6% by weight and the component (d) used is glycerol in an amount of 3% by weight.

In addition to the above-described combination of the components (c) and (d), it is possible to use the starting materials customary in polyurethane chemistry for producing the polyurethane foams of the present invention. The following may be said by way of example about these other, customary starting materials:

a) suitable organic and/or modified organic diisocyanates and/or polyisocyanates are the aliphatic, cycloaliphatic, araliphatic and preferably aromatic polyfunctional isocyanates known per se.

Specific examples are: alkylene diisocyanates having from 4 to 12 carbon atoms in the alkylene radical, for example dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'-and 2,4'-diisocyanate and also the corresponding isomer mixtures, and preferably aromatic diisocyanates and polyisocyanates such as tolylene 2,4- and 2,6-diisocyanate (-TDI) and the corresponding isomer mixtures, diphenylmethane 4,4'-, 2,4'- and 2,2'-diisocyanate (-MDI) and the corresponding isomer mixtures, mixtures of 4,4'- and 2,2'-MDI, polyphenylpolymethylene polyisocyanates, mixtures of 4,4'-, 2,4'- and 2,2'-MDI and polyphenylpolymethylene polyisocyanates (crude MDI) and mixtures of crude MDI and TDI. The organic diisocyanates and polyisocyanates can be used individually or in the form of their mixtures.

Also suitable are modified polyfunctional isocyanates, ie. products which are obtained by chemical reaction of organic diisocyanates and/or polyisocyanates. Examples which may be mentioned are diisocyanates and/or polyisocyanates containing ester, urea, biuret, allophanate, isocyanurate and preferably carbodiimide, uretonimine and/or urethane groups. Specific examples of suitable modified polyfunctional isocyanates are: prepolymers containing urethane groups and having an NCO content of from 14 to 2.8% by weight, preferably from 12 to 3.5% by weight, or pseudoprepolymers having an NCO content of from 35 to 14% by weight, preferably from 34 to 22% by weight, where urethane-modified polyisocyanates derived from TDI have, in particular, an NCO content of from 43 to 28% by weight and those derived from 4,4'-MDI, 4,4'- and 2,4'-MDI isomer mixtures or crude MDI have, in particular, an NCO content of from 28 to 14% by weight, particularly preferably from 28 to 22% by weight, based on the total weight, and are prepared by reacting diols, oxyalkylene glycols and/or polyoxyalkylene glycols having molecular weights of from 62 to 6000, preferably from 134 to 4200, with TDI, 4,4'-MDI, MDI isomer mixtures and/or crude MDI, for example at from 20 to 110° C., preferably from 50 to 90° C., with examples of oxyalkylene and polyoxyalkylene glycols which can be used individually or as mixtures being diethylene glycol, dipropylene glycol, polyoxyethylene glycol, polyoxypropylene glycol and polyoxypropylene polyoxyethylene glycol; polyisocyanates containing carbodiimide groups and/or uretonimine groups, eg. those based on MDI isomers and/or TDI.

The modified polyisocyanates can, if desired, be mixed with one another or with unmodified organic polyisocyanates such as 2,4'-and/or 4,4'-MDI, crude MDI, 2,4- and/or 2,6-TDI.

Organic polyisocyanates which have been found to be particularly useful and are therefore preferably employed are: mixtures of TDI and crude MDI or mixtures of modified organic polyisocyanates containing urethane groups and having an NCO content of from 44 to 15% by weight, in particular those based on TDI, 4,4'-MDI, MDI isomer mixtures or crude MDI and in particular crude MDI having an MDI isomer content of from 30 to 80% by weight, preferably from 30 to 55% by weight.

b) As relatively high molecular weight compounds containing at least two reactive hydrogen atoms, use is advantageously made of those having a functionality of from 2 to 4, preferably from 2 to 3, and a molecular weight of from 300 to 8000, preferably from 300 to 5000.

Examples of compounds which have been found to be useful are polyetherpolyamines and/or preferably polyols selected from the group consisting of polyether polyols, polyester polyols, polythioether polyols, polyesteramides, hydroxyl-containing polyacetals and hydroxyl-containing aliphatic polycarbonates or mixtures of at least two of the polyols mentioned. Preference is given to using polyester polyols and/or polyether polyols. The hydroxyl number of these polyhydroxyl compounds is generally from 20 to 80 and preferably from 28 to 56.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives such as dicarboxylic esters of alcohols having from 1 to 4 carbon atoms or dicarboxylic anhydrides. Preference is given to using dicarboxylic acid mixtures of succinic, glutaric and adipic acids in weight ratios of, for example, 20–35:35–50:20–32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is also possible to use polyester polyols derived from lactones, eg. ε-caprolactone, or hydroxycarboxylic acids, eg. ω-hydroxycaproic acid.

To prepare the polyester polyols, the organic, eg. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas, eg. nitrogen, carbon monoxide, helium, argon, etc., in the melt at from 150 to 250° C., preferably from 180 to 220° C., under atmospheric pressure or reduced pressure to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distill off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2. The polyester polyols obtained preferably have a functionality of from 2 to 4, in particular from 2 to 3, and a molecular weight of from 480 to 3000, in particular from 600 to 2000.

However, polyols which are particularly preferably used are polyether polyols which are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 4, preferably 2 or 3, reactive hydrogen atoms in bound form, or by cationic polymerization using Lewis acids such as antimony pentachloride, boron fluoride etherate, etc., or bleaching earth as catalysts.

For specific applications, monofunctional initiators can also be incorporated into the polyether structure. Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Examples of suitable initiator molecules are: water, organic dicarboxylic acids such as succinic acid, adipic acid, phthalic acid and terephthalic acid, aliphatic and aromatic, unalkylated, N-monoalkylated, N,N-dialkylated and N,N'-dialkylated diamines having from 1 to 4 carbon atoms in the alkyl radical, for example unalkylated, monoalkylated and dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine and 4,4'-, 2,4'- and 2,2'-diaminodiphenylmethane. Further suitable initiator molecules are: alkanolamines such as ethanolamine, N-methylethanolamine and N-ethylethanolamine, dialkanolamines such as diethanolamine, N-methyldiethanolamine and N-ethyldiethanolamine, and trialkanolamines such as triethanolamine, and ammonia. Preference is given to using polyhydric, in particular dihydric and/or trihydric, alcohols such as ethanediol, 1,2- and 2,3-propanediol, diethylene glycol, dipropylene glycol, 1,4-butanediol, 1,6-hexanediol, glycerol, trimethylolpropane and pentaerythritol.

The polyether polyols, preferably polyoxypropylene polyols and polyoxypropylene polyoxyethylene polyols, have a functionality of preferably from 2 to 4 and in particular from 2 to 3 and molecular weights of from 300 to 8000, preferably from 300 to 6000 and in particular from 1000 to 5000, and suitable polyoxytetramethylene glycols have a molecular weight up to about 3500.

Also suitable as polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, eg. in a weight ratio of from 90:10 to 10:90, preferably from 70:30 to 30:70, advantageously in the abovementioned polyether polyols as described in the German Patents 1111394, 1222669 (U.S. Pat. Nos. 3,304,273, 3,383,351, 3,523,093), 1,152,536 (GB 1040452) and 1,152,537 (GB 987618), and also polyether polyol dispersions which contain as disperse phase, customarily in an amount of from 1 to 50% by weight, preferably from 2 to 25% by weight, eg. polyureas, polyhydrazides, polyurethanes containing bound tertiary amino groups and/or melamine, and are described, for example, in EP-B-011752 (U.S. Pat. No. 4,304,708), U.S. Pat. No. 4,374,209 and DE-A-3231497.

Like the polyester polyols, the polyether polyols can be used individually or in the form of mixtures. Furthermore, they can be mixed with the graft polyether polyols or polyester polyols or with the hydroxyl-containing polyester amides, polyacetals, polycarbonates and/or polyetherpolyamines.

Suitable hydroxyl-containing polyacetals are, for example, the compounds which can be prepared from glycols such as diethylene glycol, triethylene glycol, 4,4'-dihydroxyethoxydiphenyldimethylmethane, hexanediol and formaldehyde. Suitable polyacetals can also be prepared by polymerization of cyclic acetals.

Suitable hydroxyl-containing polycarbonates are those of the type known per se, which can be prepared, for example, by reacting diols such as 1,3-propanediol, 1,4-butanediol and/or 1,6-hexanediol, diethylene glycol, triethylene glycol or tetraethylene glycol with diaryl carbonates, eg. diphenyl carbonate, or phosgene.

The polyester amides include, for example, the predominantly linear condensates obtained from polybasic, saturated and/or unsaturated carboxylic acids or their anhydrides and polyfunctional saturated and/or unsaturated aminoalcohols or mixtures of polyfunctional alcohols and amino alcohols and/or polyamines.

Suitable polyetherpolyamines can be prepared from the abovementioned polyether polyols by known methods. Examples which may be mentioned are the cyanoalkylation of polyoxyalkylene polyols and subsequent hydrogenation of the nitrile formed (U.S. Pat. No. 3,267,050) or the partial or complete amination of polyoxyalkylene polyols with amines or ammonia in the presence of hydrogen and catalysts (DE-A-1215373).

c) According to the present invention, the production of the polyurethane foams is carried out using ethylene oxide-rich adducts, as are described above, as compounds containing from three to eight, preferably from three to six, reactive hydrogen atoms.

d) The above-described chain extenders and/or crosslinkers are used for producing the polyurethane foams of the present invention. However, the addition of further chain extenders, crosslinkers or, if desired, mixtures thereof may prove to be advantageous for modifying the mechanical properties. As further chain extenders and/or crosslinkers, use is made of diols and/or triols having molecular weights of less than 400, preferably from 60 to 300. Examples of suitable chain extenders/crosslinkers are aliphatic, cycloaliphatic and/or araliphatic diols having from 2 to 14, preferably from 4 to 10, carbon atoms, eg. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- and 1,3,5-trihydroxycyclohexane, and low molecular weight hydroxyl-containing polyalkylene oxides based on ethylene oxide and/or 1,2-propylene oxide and the abovementioned diols and/or triols as initiator molecules.

If further chain extenders, crosslinkers or mixtures thereof are employed for producing the polyurethane foams, these are present in an amount of from 0 to 20% by weight.

e) As blowing agents, it is possible to use the chlorofluorocarbons (CFCs) and highly fluorinated and/or perfluorinated hydrocarbons generally known from polyurethane chemistry. However, for ecological reasons, the use of these materials is being greatly restricted or completely stopped. Alternative blowing agents are, apart from HCFCs and HFCs, in particular aliphatic and/or cycloaliphatic hydrocarbons, in particular pentane and cyclopentane, or acetals such as methylal. These physical blowing agents are usually added to the polyol component of the system. However, they can also be added to the isocyanate component or to both the polyol component and the isocyanate component. They can also be used together with highly fluorinated and/or perfluorinated hydrocarbons in the form of an emulsion of the polyol component. If emulsifiers are employed, use is usually made of oligomeric acrylates which contain bound polyoxyalkylene and fluoroalkane radicals as side groups and have a fluorine content of from about 5 to 30% by weight. Such products are sufficiently well known from plastics chemistry, eg. EP-A 351614.

The amount of blowing agent or blowing agent mixture used is from 1 to 25% by weight, preferably from 1 to 15% by weight, in each case based on the components (b) to (g).

Furthermore, it is possible and customary to add water as blowing agent in the formative component (b) in an amount of from 0.5 to 15% by weight, preferably from 1 to 5% by weight, based on the formative components (b) to (g). The addition of water can be carried out in combination with the use of the other blowing agents described.

f) catalysts used for producing polyurethane foams are, in particular, compounds which strongly accelerate the reaction of the compounds containing reactive hydrogen atoms, in particular hydroxyl groups, of the components (b), (c) and (d) with the organic, modified or unmodified polyisocyanates (a). Suitable catalysts are organic metal compounds, preferably organic tin compounds such as tin(II) salts of organic carboxylic acids, eg. tin(II) acetate, tin(II) octoate, tin(II) ethylhexanoate and tin(II) laurate, and the dialkyltin (IV) salts of organic carboxylic acids, eg. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylaminoethyl)ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyldiethanolamine and N-ethyldiethanolamine and dimethylethanolamine.

Further suitable catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide, and also alkali metal salts of long-chain fatty acids having from 10 to 20 carbon atoms and possibly lateral OH groups. Preference is given to using from 0.001 to 5% by weight, in particular from 0.05 to 2% by weight, of catalyst or catalyst combination, based on the weight of the formative components (b) to (g).

g) If desired, further auxiliaries and/or additives can be incorporated into the reaction mixture for producing the polyurethane foams. Examples which may be mentioned are flame retardants, surface-active substances, foam stabilizers, cell regulators, fillers, dyes, pigments, hydrolysis inhibitors, fungistatic and bacteriostatic substances.

Suitable flame retardants are, for example, tricresyl phosphate, tris(2-chloroethyl) phosphate, tris(2-chloropropyl) phosphate, tetrakis(2-chloroethyl)ethylene diphosphate, dimethyl methanephosphonate, diethyldiethanolaminomethylphosphonate and also commercial halogen-containing flame-retardant polyols. Apart from the abovementioned halogen-substituted phosphates, it is also possible to use inorganic or organic flame retardants such as red phosphorus, hydrated aluminum oxide, antimony trioxide, arsenic oxide, ammonium polyphosphate and calcium sulfate, expandable graphite or cyanuric acid derivatives such as melamine, or mixtures of at least two flame retardants such as ammonium polyphosphate and melamine and also, if desired, maize starch or ammonium polyphosphate, melamine and expandable graphite and/or aromatic or aliphatic polyesters for making the polyisocyanate polyaddition products flame resistant. Additions of melamine are found to be particularly effective. In general, if has been found to be advantageous to use from 5 to 50 parts by weight, preferably from 5 to 25 parts by weight, of the flame retardants mentioned per 100 parts by weight of the formative components (b) to (g).

Suitable surface-active substances are, for example, compounds which serve to aid the homogenization of the starting materials and may also be suitable for regulating the cell structure of the plastics. Examples which may be mentioned are emulsifiers such as the sodium salts of castor oil sulfates or of fatty acids and also amine salts of fatty acids, eg. diethylamine oleate, diethanolamine stearate, diethanolamine ricinoleate, salts of sulfonic acids, eg. alkali metal or ammonium salts of dodecylbenzene- or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or stabilizing the foam. The surface-active substances are usually employed in amounts of from 0.01 to 5 parts by weight, based on 100 parts by weight of the formative components (b) to (g).

For the purpose of the present invention, fillers, in particular reinforcing fillers, are the customary organic and inorganic fillers, reinforcing materials, weighting agents, agents for improving the abrasion behavior in paints, coatings, etc., known per se. Specific examples are: inorganic fillers such as siliceous minerals, for example sheet silicates such as antigorite, serpentine, hornblends, amphiboles, chrysotile, talc; metal oxides such as kaolin, aluminum oxides, titanium oxides and iron oxides, metal salts such as chalk, barite and inorganic pigments such as cadmium sulfide, zinc sulfide, and also glass, etc. Preference is given to using kaolin (China Clay), aluminum silicate and coprecipitates of barium sulfate and aluminum silicate and also natural and synthetic fibrous minerals such as wollastonite, metal and in particular glass fibers of various lengths which may be coated with a size. Suitable organic fillers are, for example: carbon, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters and, in particular, carbon fibers. The inorganic and organic fillers can be used individually or as mixtures and are advantageously incorporated into the reaction mixture in amounts of from 0.5 to 50% by weight, preferably from 1 to 40% by weight, based on the weight of the components (a) to (g), but the content of mats, nonwovens and woven fabrics of natural and synthetic fibers can reach values of up to 80% by weight.

Further details regarding the abovementioned other customary auxiliaries and additives may be found in the specialist literature, for example the monograph by J. H. Saunders and K. C. Frisch "High Polymers" Volume XVI, Polyurethanes, Parts 1 and 2, Interscience Publishers 1962 and 1964, or the Kunststoffhandbuch, Polyurethane, Volume VII, Hanser-Verlag Munich, Vienna, 1st, 2nd and 3rd editions, 1966, 1983 and 1993.

To produce the polyurethane foams, the components (a) to (g) are reacted in such amounts that the equivalence ratio of the NCO groups of the component (a) to the sum of the reactive hydrogen atoms of the components (b) to (g) is 0.60–1.25:1, preferably 0.90–1.15:1.

Polyurethane foams produced by the process of the present invention are advantageously produced by the one-shot method, for example by means of the high-pressure or low-pressure technique, in open or closed molds, for example metal molds. The continuous application of the reaction mixture to suitable conveyor belts for producing foam blocks is also customary.

It has been found to be particularly advantageous to employ the two-component method and to combine the formative components (b), (c), (d), (e), (f) and, if used, (g) to form a polyol component, often also designated as component A, and to use the formative component (a) and, if desired, blowing agents (e) as isocyanate component, often also designated as component B. The starting components are mixed at from 15 to 90° C., preferably from 20 to 60° C. and in particular from 20 to 35° C., and introduced into the open mold or under atmospheric pressure or superatmospheric pressure into the closed mold or, in the case of a continuous workstation, applied to a belt which accommodates the reaction mixture. Mixing can be carried out mechanically by means of a stirrer, by means of a stirring spoon or by means of high-pressure mixing in a nozzle. The mold temperature is advantageously from 20 to 110° C., preferably from 30 to 65° C. and in particular from 35 to 65° C.

The polyurethane foams produced by the process of the present invention have a density of from 10 to 800 kg/m$^3$, preferably from 35 to 70 kg/m$^3$ and in particular from 25 to 50 kg/m$^3$. They are particularly suitable as upholstery material in the furniture and automobile seat sectors, but also, with correspondingly higher foam densities, as integral foam components in automobile safety applications.

They are particularly suitable for use in climatic regions having a high atmospheric humidity, where corresponding resistance is absolutely necessary. They are also suitable, in the case of relatively low densities, for producing foams which, despite the lower density, have sufficiently good mechanical properties and maintain them over a prolonged period of time.

The present invention is illustrated by the examples below without being restricted thereby.

EXAMPLES 1–4 (COMPARATIVE EXAMPLES)

| | Example 1 | Example 2 | Example 3 | Example 4 |
|---|---|---|---|---|
| Lupranol ® 2042 | 60.05 | 57.95 | 56.90 | 63.10 |
| Lupranol ® 4100 | 30.00 | 30.00 | 30.00 | 30.00 |
| Glycerol | 1.00 | 3.00 | 4.00 | |
| Diethylene glycol | 2.00 | 2.00 | 2.00 | |
| Triethanolamine | | | | 3.20 |
| Lupranol ® 2047 | 3.00 | 3.00 | 3.00 | |
| Lupragen ® N201 | 0.40 | 0.50 | 0.55 | 0.15 |
| Lupragen ® N206 | 0.25 | 0.25 | 0.25 | 0.25 |
| B 8680 | 0.30 | 0.30 | 0.30 | 0.30 |
| Water | 3.00 | 3.00 | 3.00 | 3.00 |
| FD (core) | 37.00 | 36.70 | * | 36.60 |
| CS, 70° C. | 84.70 | 33.40 | * | 70.30 |
| CS, 40° C., 98% RH. | 91.50 | 70.10 | * | 83.90 |
| CStr, 50% | 4.20 | 5.40 | * | 4.20 |

Index 100; *unsatisfactory foam
Lupranol ® 2042 OH number 28 mg KOH/g, polyetherol based on propylene oxide and ethylene oxide (BASF),
Lupranol ® 2047 OH number 42 mg KOH/g, polyetherol based on propylene oxide and ethylene oxide (BASF)
Lupranol ® 4100 OHN 24 mg KOH/g, polymer polyol based on acrylonitrile/styrene (BASF),
Lupragen ® N201 Amine catalyst (BASF),
Lupragen ® N206 Amine catalyst (BASF),
B 8680 Silicone stabilizer (Goldschmidt),
FD (core) Foam density of core in kg/m$^3$,
CS Compressive set at the temperature indicated, measured by Methode D'Essai 1046,
RH Relative atmospheric humidity,
CStr 50% Compressive strength - Methode D'Essai 1003

EXAMPLES 5–8 (ACCORDING TO THE PRESENT INVENTION)

|  | Example 5 | Example 6* | Example 7 | Example 8 |
|---|---|---|---|---|
| Lupranol ® 2042 | 53.30 | 53.30 | 77.05 | 55.05 |
| Lupranol ® 4100 | 30.00 | 30.00 | 10.00 | 30.00 |
| Glycerol | 0.60 | 0.60 | 3.00 | 3.00 |
| Lupranol ® 2047 | 4.00 | 4.00 | | |
| Lupranol ® VP 9236 | 8.50 | 8.50 | | |
| Lupranol ® VP 9209 | | | 5.00 | 7.00 |
| Lupragen ® N201 | 0.15 | 0.15 | 0.30 | 0.40 |
| Lupragen ® N206 | 0.15 | 0.15 | 0.25 | 0.25 |
| XFH 2584 | | | | 0.30 |
| B 8680 | 0.30 | 0.30 | 0.40 | |
| Water | 3.00 | 3.00 | 4.00 | 3.00 |
| FD | 40.00 | 40.00 | 37.00 | 36.00 |
| CS, 70° C. | 18.20 | 25.40 | 17.50 | 16.00 |
| CS, 40° C., 98% RH. | 30.60 | 36.40 | 21.80 | 23.90 |
| CStr, 50% | 8.00 | 11.20 | 4.70 | 5.70 |

*Index$_{110}$
Lupranol ® VP 9209 OHN 530 mg KOH/g, trifunctional polyol based on ethylene oxide (BASF),
Lupranol ® VP 9236 OHN 605 mg KOH/g, trifunctional polyol based on ethylene oxide (BASF),
XFH 2584 Dabco XFH 2584 - silicone stabilizer (Air Products)

We claim:

1. A process for producing polyurethane foams comprising reacting:
   a) organic and/or modified organic diisocyanates and/or polyisocyanates with;
   b) at least one compound containing at least two isocyanate reactive hydrogen atoms, having a molecular weight of between about 300 to 8000 and a OH number of between 20 to 80;
   c) at least one compounding containing from three to eight isocyanate reactive hydrogen atoms, and
   d) chain extenders and/or crosslinkers containing at least two isocyanate reactive hydrogen atoms in the presence of
   e) blowing agents
   f) catalysts and, optionally,
   g) further auxiliaries and additives,
       wherein component (c) comprises ethylene oxide-rich adducts having an ethylene oxide content of more than 50% by weight and an OH number of from 200 to 800 mg KOH/g; component (d) comprises polyfunctional chain extenders and/or crosslinkers having an OH number of more than 700 mg KOH/g; and the mole ratio of component c) to component d) is from 10:1 to 0.3:1.

2. A process as claimed in claim 1, wherein the relatively high functionality compounds (c) are used in proportions of from 0.5 to 10% by weight, based on the weight of the components (b) to (g).

3. A process as claimed in claim 1, wherein the relatively high functionality compounds (c) are used in proportions of from 1 to 8% by weight, based on the weight of the components (b) to (g).

4. A process as claimed in claim 1, wherein the polyfunctional chain extenders and/or crosslinkers (d) are used in proportions of from 0.5 to 6% by weight, based on the weight of the components (b) to (g).

5. A process as claimed in claim 1, wherein the polyfunctional chain extenders and/or crosslinkers (d) are used in proportions of from 0.5 to 4% by weight, based on the weight of the components (b) to (g).

6. A process as claimed in claim 1, wherein the component (c) comprises ethylene oxide adducts of glycerol, trimethylolpropane, pentaerythritol or mixtures thereof.

7. A process as claimed in claim 1, wherein the component (d) comprises glycerol.

8. A polyurethane foam comprising the reaction product of:
   (a) organic and/or modified organic diisocyanates and/or polyisocyanates with
   (b) at least one compound containing at least two isocyanate reactive hydrogen atoms, having a molecular weight of between about 300 to 8000, an OH number of between 20 to 80, and a functionality of between two to four;
   (c) at least one compound containing from three to eight isocyanate reactive hydrogens and
   (d) at least one chain extender and/or crosslinker containing at least two isocyanate reactive hydrogen atoms,
   e) blowing agents,
   f) catalysts and, optionally,
   g) further auxiliaries and additives,
       wherein the component (c) comprises ethylene oxide-rich adducts having an ethylene oxide content of more than 90% by weight and an OH number of from 400 to 800 mg KOH/g in proportions from 0.5 to 10% by weight, based on the weight of the components (b) to (g), and the component (d) comprises polyfunctional chain extenders and/or crosslinkers having an OH number of more than 700 mg KOH/g in proportions of from 0.5 to 6% by weight, based on the weight of components (b) to (g); and the mole ratio of component c) to component d) is from 10:1 to 0.3:1.

9. A polyurethane foam made in accordance with the process of claim 1.

* * * * *